No. 768,465. PATENTED AUG. 23, 1904.
G. J. KENNEDY.
AIR COMPRESSOR PISTON VALVE.
APPLICATION FILED DEC. 31, 1902.
NO MODEL.

Witnesses

Inventor
George J. Kennedy.
by Edson Bro's,
Attorneys.

No. 768,465. Patented August 23, 1904.

UNITED STATES PATENT OFFICE.

GEORGE J. KENNEDY, OF BALTIMORE, MARYLAND.

AIR-COMPRESSOR PISTON-VALVE.

SPECIFICATION forming part of Letters Patent No. 768,465, dated August 23, 1904.

Application filed December 31, 1902. Serial No. 137,358. (No model.)

*To all whom it may concern:*

Be it known that I, GEORGE J. KENNEDY, a citizen of the United States, residing at Baltimore, in the State of Maryland, have invented certain new and useful Improvements in Air-Compressor Piston-Valves; and I do hereby declare the following to be a full, clear, and exact description of the invention, such as will enable others skilled in the art to which it appertains to make and use the same.

My invention relates to certain improvements in air-compressors, more especially that class adapted to supply air via the piston to the piston chamber or cylinder.

It has for its object, among other things, to keep the piston in a cool state irrespective of the point of stroke, also to preserve the uniformity of movement of the piston within its chamber as against impingement or undue frictional contact with the walls of said chamber as would otherwise arise, also to provide for a more adequate supply of the air to the piston-chamber and to promote longevity of use.

Said invention consists of the combination and arrangement of parts, as herein more fully disclosed, and specifically pointed out in the claims.

Figure 1:
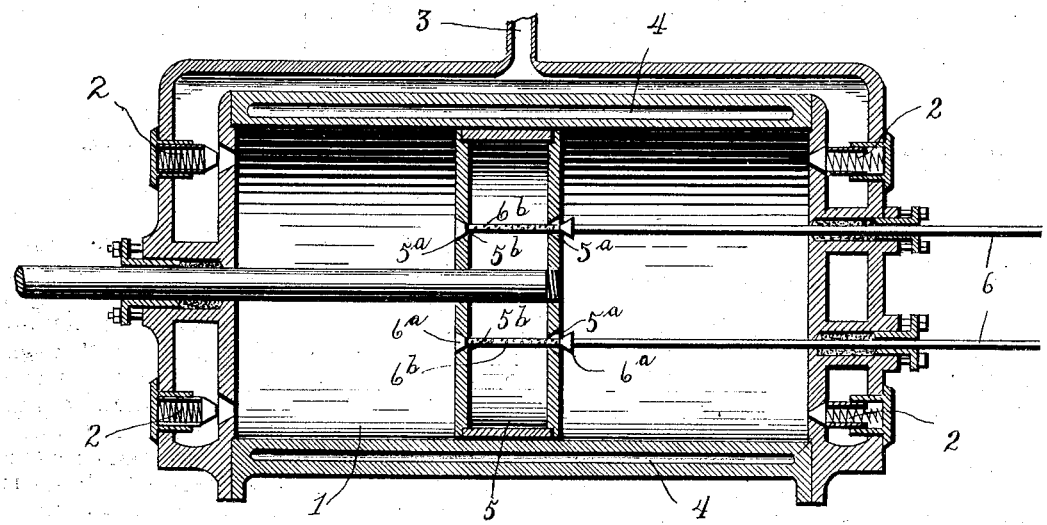
Figure 2:
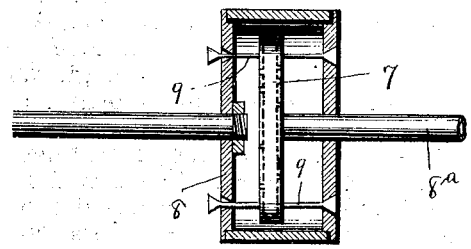
Figure 3:
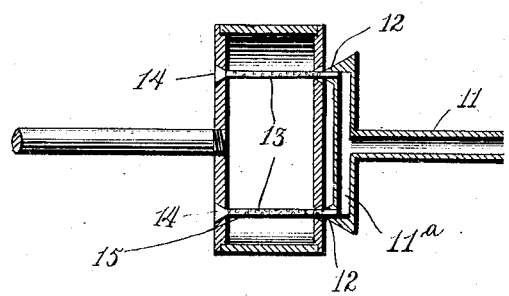

In the accompanying drawings, illustrating the preferred embodiment of my invention, Figure 1 is a longitudinal section thereof. Fig. 2 is a modification of the same. Fig 3 is a second modification thereof.

It will be undersood that I do not limit myself as to the details herein, as the same may be changed as circumstances may suggest without departing from the spirit of my invention and the same remain intact and be protected.

In carrying out my invention I provide a suitable chamber or cylinder 1, having at its opposite ends outlet-valves 2 for the delivery of the air therefrom via the delivery-pipe 3, leading to the point where it is desired to utilize the air. Said chamber or cylinder is compassed by a cooling-jacket 4, as is common in this class of devices. Within said chamber or cylinder is arranged a piston 5, preferably hollow or chambered, with valve-seats $5^a$ arranged in each of the outer surfaces of its two heads, preferably of conical form, surrounding passages or orifices $5^b$, the passages on opposite sides of the piston being arranged in line with each other. Two or more hollow air inlets or pipes 6, suitably passed through one of the heads of said piston-chamber and having stuffing-box connection therewith, also extend through the said passages of said hollow piston, each tube being provided with two oppositely-seating conical valves $6^a$, those at opposite ends or heads of the piston opening and closing alternately, according to the direction of the stroke of the piston, as will be readily understood. Intermediately of each set of valves each hollow inlet or tube is provided with a series of air inlets or openings $6^b$, distributed along the surface thereof within the hollow piston, so that whichever set or series of valves may be open air will be delivered within said piston to retain the same cool throughout its entire area as against undue heating from friction, &c. It will be noted that as said piston moves in one direction the air admitted through the hollow or tubular inlets will pass through certain perforations or air-passages and partly into said piston for the cooling of the same, as above noted, and that a portion of said air will pass out through other of said orifices or openings and be delivered into the piston cylinder or chamber for storage or delivery therefrom, as above indicated; also, that during the opposite movement of the piston the other series or set of valves will be likewise unseated and permit the like passage or delivery of the air entering said tubular air-inlets, thus providing for a continuous admission and delivery of the air. It will also be noted that in the use of a plurality of or duplicate hollow air-inlet tubes the piston will not be unbalanced, as would be the case in the use of a single tube arranged eccentrically with the piston-rod, and therefore will prevent irregularity of movement or oscillation of the piston, which would have the effect to create unnecessary friction of the piston upon the walls of the piston chamber or cylinder, as would be apparent; also, that by the use of a plurality of such air-inlet tubes an increased supply of air is obtained, providing for the more effective cooling of the piston, as well as increasing the supply of air for storage, &c.

In the modification as disclosed by Fig. 2 I may substitute in lieu of the arrangement above described a hollow piston or disk-like member or head 7, provided with a series of openings and arranged concentrically within the hollow piston 8 and terminating in a single central hollow air inlet or tube 8ⁿ, said member or head carrying stems or rods 9, passing transversely loosely through the piston-heads and provided at their ends with conical valves closing openings or seats communicating with said hollow piston. In this arrangement it will be observed that the air will be admitted through said head or member interiorly of said hollow piston and out therefrom through the openings or orifices in said hollow piston into the piston chamber or cylinder, thus obtaining the same result as above noted.

In the modification as disclosed by Fig. 3 I may employ in lieu of either of the foregoing forms of my invention a hollow tubular inlet 11, connected to a hollow piston-head-like member 11ª, having conical valves 12 12, with tubular extensions 13 extending therefrom through the hollow piston, the opposite ends of said extensions having also conical valves 14, preferably integral therewith, each of said tubular extensions also having a series of perforations or orifices 15. It will be noted that said piston-head-like member is arranged externally of the hollow piston and that the orifices or apertures in said valve extensions are adapted to deliver the air into said hollow piston and also externally thereof.

Having thus described my invention, what I claim as new, and desire to secure by Letters Patent, is—

1. In an air-compressor of that class employing a hollow or chambered piston and having a fixed piston-rod attached to said piston, a hollow air inlet or tube provided with oppositely-facing valves seating exteriorly in the heads of said piston and adapted to be actuated by said air-inlet tube, and said tube adapted to deliver air to the interior of said piston and into the piston-cylinder, the seats of said valves establishing communication between the interior of said piston and the interior of said cylinder.

2. In an air-compressor of that class employing a hollow or chambered piston and having a fixed piston-rod attached to said piston, a cylinder for said piston, a tubular air-inlet having oppositely-facing valves seated exteriorly in the heads of said piston, and said tubular air-inlet also having means arranged intermediately of said valves to deliver air to the interior of said piston, the seats of said piston-valves establishing communication between the interior of said piston and the interior of said cylinder.

3. In an air-compressor, the combination of a hollow or chambered piston, a cylinder for said piston, a tubular air-inlet, oppositely-facing valves seating exteriorly in the heads of said piston and adapted to be actuated by said tubular inlet, said oppositely-facing valves having intermediate perforated tubular portions communicating with said tubular inlet, the seats of said valves establishing communication between the interior of said cylinder carried by said tubular inlet, intermediately of said valves.

4. In an air-compressor, the combination of a hollow or chambered piston, a cylinder, for said piston, a hollow air-inlet, oppositely-facing valves seating exteriorly in the heads of said piston and each pair of valves being connected by a perforated tubular member connecting by an additional tubular member with said hollow inlet, the seats of said valves establishing communication between the interior of said piston and the interior of said cylinder.

In testimony whereof I affix my signature in presence of two witnesses.

GEORGE J. KENNEDY.

Witnesses:
 AUG. W. BRADFORD,
 THOS. KELL BRADFORD.